INVENTOR.
Douglas B. Tiffany
BY
Brown and Mikulka
and
Robert E. Corb
ATTORNEYS

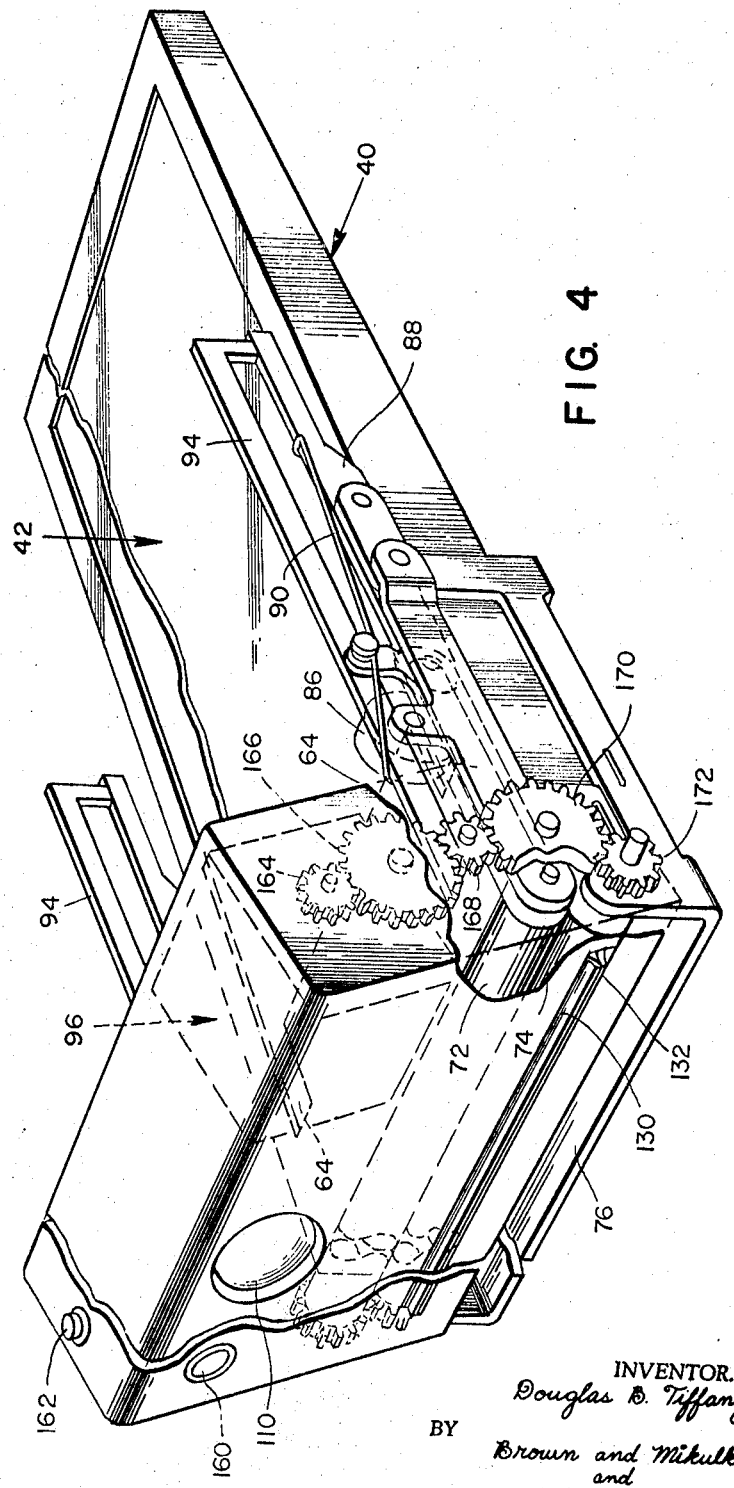

United States Patent Office

3,447,437
Patented June 3, 1969

---

3,447,437
PHOTOGRAPHIC PROCESSING APPARATUS
Douglas B. Tiffany, Cambridge, Mass., assignor to Polaroid Corporation, Cambridge, Mass., a corporation of Delaware
Filed July 25, 1967, Ser. No. 655,808
Int. Cl. G03b *17/52*
U.S. Cl. 95—13      8 Claims

ABSTRACT OF THE DISCLOSURE

A self-developing camera including a pair of processing rollers for advancing a film unit between the rollers to process the film unit and a feed roller driven simultaneously with the processing rollers for frictionally engaging and feeding the film units, one at a time, from a film pack container into the bite of the processing rollers. The mounting for the feed roller is coupled with one of the processing rollers so as to disenable the feed roller to feed a film unit into the bite of the processing rollers as long as a film unit is engaged therebetween.

---

In the copending U.S. patent application of Edwin H. Land et al., Ser. No. 655,850, filed on an even date herewith, there is described a compact, folding, self-developing camera for use with a film pack comprising a plurality of individual film units arranged in stacked relation in a container and adapted to be exposed within the container and then feed from the container and processed one at a time in succession. The camera includes a processing system comprising a pair of spring biased, pressure-applying rolls, an electric motor for driving the rolls, a battery for powering the motor and controls for the motor, and film feed means for feeding exposed film units, one at a time, from the film pack container into the bite of the processing rolls. The film feed means include a feed roll supported in frictional engagement with the film unit (at the front of the stack) positioned for exposure, and which is driven simultaneously with the processing rolls by the motor.

An object of the present invention is to provide a coupling between the processing rolls and a feed roll for disengaging the feed roll from a film unit whenever a film unit is engaged between the processing rolls thereby preventing advancement of more than one film unit at a time between the processing rolls.

Another object of the invention is to provide a control system permitting exposure and processing of the film units in rapid sequence.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 4 is a perspective view of components of the camera and a film pack;

FIG. 6 is a circuit diagram showing an electrical circuit for controlling the operation of the camera.

Figure 1:
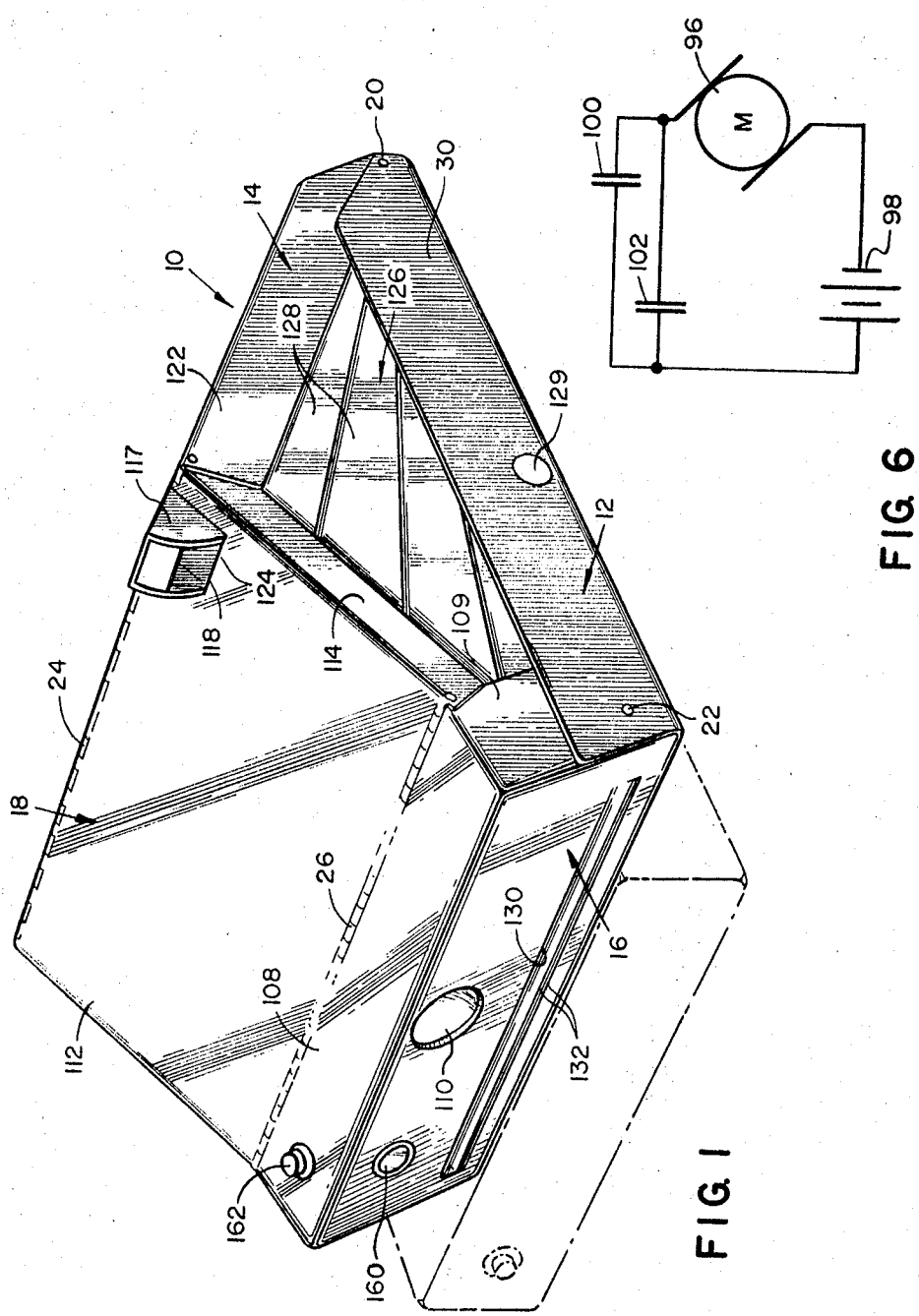
FIGURE 1 is a perspective view of the camera constructed in accordance with the invention and shown in an operative or extended condition.
Figure 2:
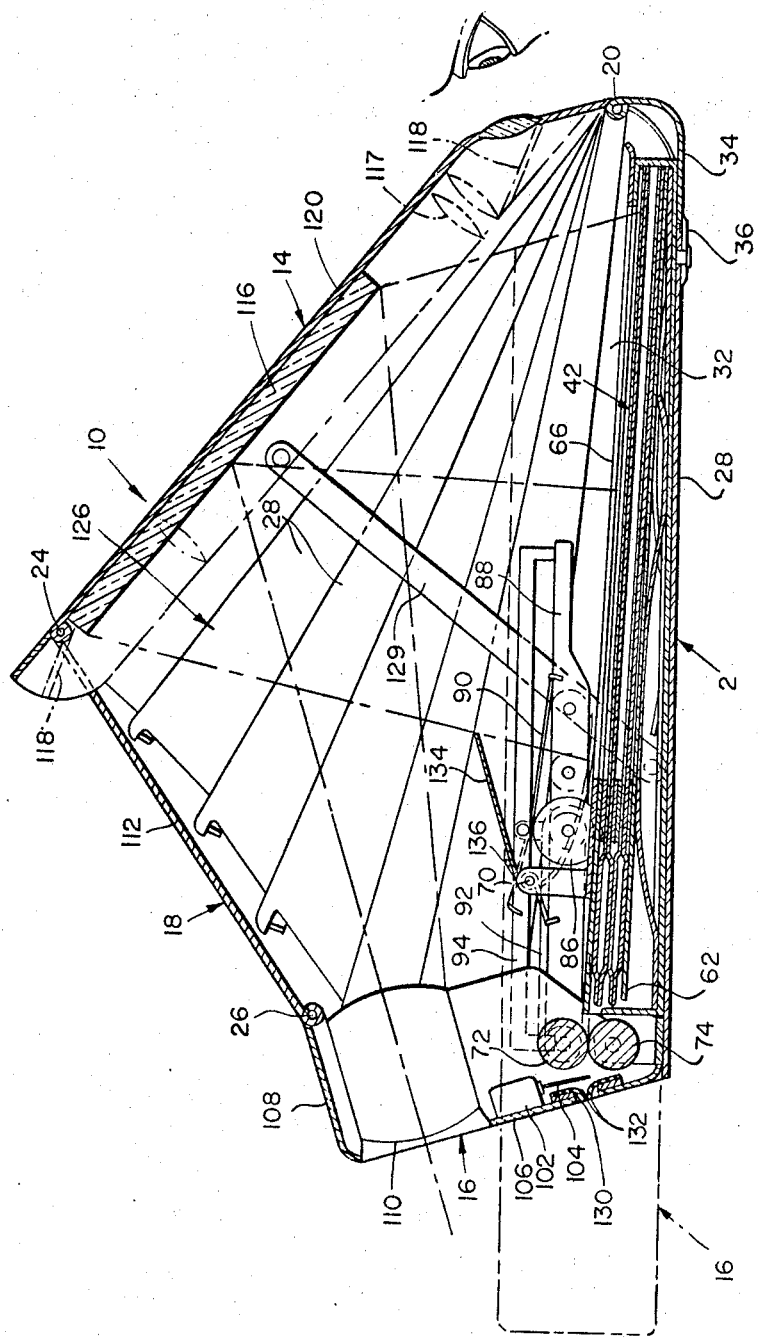
FIG. 2 is a sectional view of the camera, the section being taken between the sides of the camera and the camera being illustrated with a film pack in operative position in the camera.
Figure 3:
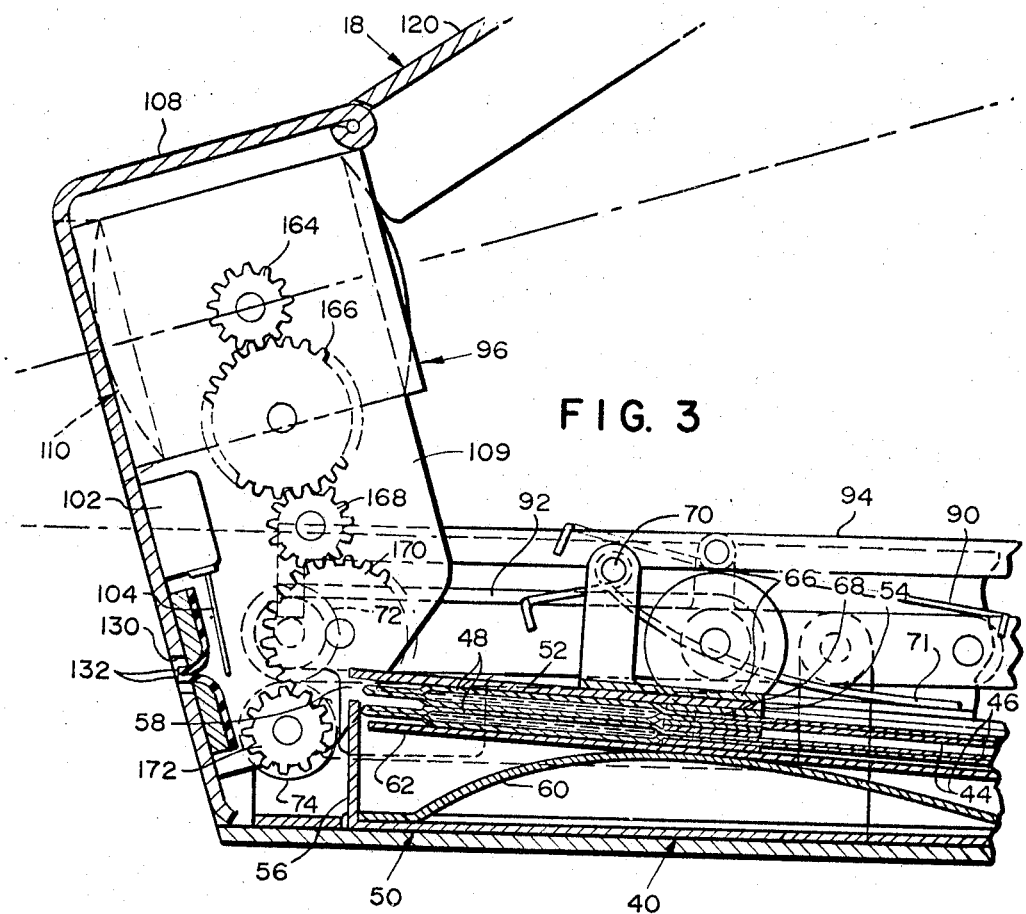
FIG. 3 is an enlarged sectional view similar to FIG. 2 showing a portion of the camera.

Reference is now made to FIGS. 1 through 3 wherein there is shown a camera, generally designated 10, comprising a housing including a first section 12, a second section 14, a third section 16, and a fourth section 18. The first housing section 12 may be characterized as the rear housing section and includes means for holding an assemblage or pack of film units with one of the film units located in position for exposure. The first housing section is pivotally connected at one end to one end of second housing section 14 at a hinge 20 and near its opposite end to third housing section 16 at pivots 22, the location of which will be described more fully hereafter. Housing sections 14 and 16 are coupled at hinges 24 and 26 respectively to fourth housing section 18 so that the four housing sections form, in effect, a four-bar linkage which is movable between an extended or operative position (see FIGURE 1) in which the housing sections are spaced apart to provide four sides of a chamber, and a folded or transport position (shown in broken lines) in which the first and third housing sections are located beside one another substantially in a line and the second and fourth housing sections are located in line with one another and in face-to-face adjacency with the first and third housing sections.

The first housing section 12 essentially comprises a generally rectangular rear wall 28, dependent side walls 30 and 32 and a door 34 pivoted about hinge 20 which is supported at its ends on side walls 30 and 32. Door 34, which forms a part of rear wall 28 and an end wall for the rear housing section, is retained in the closed position by a latch 36 and may be opened to permit loading of a film pack into the camera housing.

The camera is adapted to be employed with a film assemblage or film pack 40 including a plurality of film units 42 preferably of the type shown and described in detail in the U.S. patent application of Edwin H. Land, Ser. No. 622,287 and Edwin H. Land et al. Ser. No. 622,286, both filed Mar. 10, 1967. Film units of this type each incorporates all of the materials necessary to produce a positive photographic print including a photosensitive element 44, a second or image-receiving element 46 which is transparent and is secured in face-to-face relation with the photosensitive element, and a rupturable container 48 of processing liquid secured to one end of the photosensitive and second elements for dispensing its liquid contents therebetween in response to the application of compressive pressure to the container. Each film unit is adapted to be processed by advancing the film unit, container foremost, between a pair of pressure-applying members which dispense the liquid contents of the container therefrom between the photosensitive and second elements and spread the liquid between and in contact with the two elements toward the trailing end thereof. The image-forming process is well known in the art and involves the formation of transferable image-forming substances in the exposed photosensitive element and diffusion of the image-forming substances to another layer within the film unit where they are deposited to form a visible, positive image. In the particular example shown herein and described in the aforementioned applications, the processing liquid includes an opacifying agent which is spread in a layer between the photosensitive element, which is preferably opaque to actinic light, and the transparent image-receiving element 46 for providing a background for the photosensitive transfer image which serves to mask any image formed in the photosensitive element. The film units may be designed to be advanced from the camera into the light immediately as the processing liquid is distributed within the film unit which means that spreading of the processing liquid must be effective to prevent further exposure of the photosensitive elements almost immediately as it (liquid spreading) occurs. The opacifying agent in the processing liquid functions to prevent exposure of the photosensitive element to light transmitted by the transparent second element 46 and additionally, a desensitizing agent may be provided in the processing liquid to further insure that the photosensitive element is not exposed to the detriment of the visible image during processing outside of the camera.

A plurality of film units 42 are provided in stacked relation in an opaque container 50 having a forward wall 52 provided with an exposure aperture 54 substantially coextensive in size and shape with the image to be formed and an end wall 56 formed with a slot 58 through which the film units may be moved one at a time. A spring 60 and pressure plate 62 are provided in film pack container 50 behind the film units for supporting the forwardmost film unit in position for exposure against forward wall 52 and in alignment with exit slot 58. Openings 64 are provided in forward wall 52 adjacent the sides thereof and in the region of the containers 48 to enable engagement between the forwardmost film unit and a component of the camera for advancing the leading end of the forwardmost film unit from container 50 through slot 58 following the exposure of the film unit. The film pack is initially supplied with a dark slide (not shown) located between forward wall 52 and the forwardmost film unit 42 so as to cover exposure aperture 54 and prevent the exposure of the film units. The dark slide may be initially the same size as a film unit and can be withdrawn from the film pack through slot 58 in the same manner as the film unit.

As previously indicated, rear housing section 12 includes holding means for positioning film pack 40 in the camera with the forwardmost film unit 42 supported in position for exposure and, in the form shown, comprises a plate 66 formed with a rectangular exposure aperture 68 mounted near its end opposite door 34 for pivotal movement about a shaft 70 and biased in a clockwise direction by a torsion spring 71 engaged around pin 70 which urges the end of plate 66 closest door 34, toward rear wall 28 against a stop (not shown) which locates the rear surface of plate 66 slightly forwardly of the focal surface of the camera lens so as to locate the photosensitive element of the forwardmost unit at the focal surface of the lens. Film pack 40 is thicker at the end enclosing containers 48 than it is at the opposite end and the pivotal mounting of plate 66 is provided to enable the introduction of a film pack into the camera through door 34 into the position shown in FIG. 2.

Figure 5:
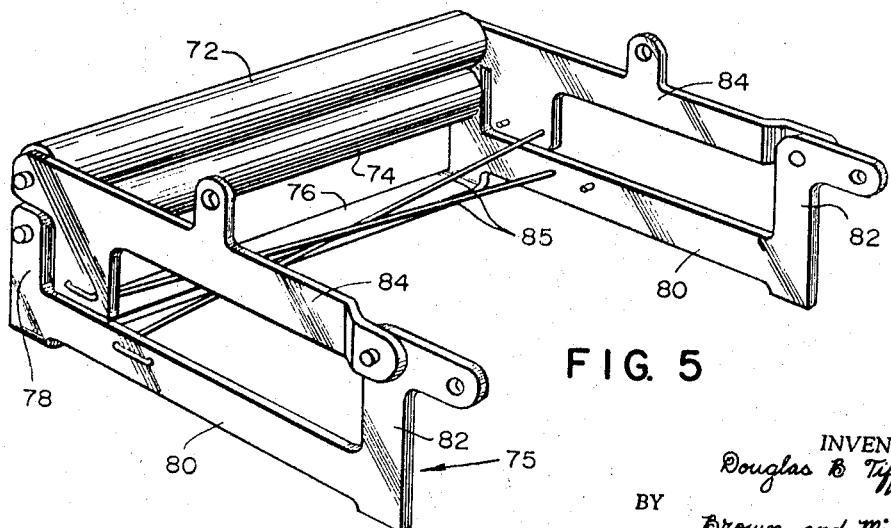
FIG. 5 is an enlarged perspective view of components of the camera.

The first section 12 of the camera housing also includes means for processing each film unit following exposure and in the form shown, these means comprise a pair of rolls 72 and 74 mounted in juxtaposition for rotation about axes located substantially in a plane perpendicular to rear wall 28, with the bite of the rolls located closely adjacent and in substantial alignment with slot 58 in film pack container 50. Means are provided for mounting the rolls in juxtaposition and biasing the rolls toward one another so as to apply compressive pressure to a film unit during movement of the film unit between the rolls. The mounting means comprise a frame 75 shown in detail in FIG. 5 and including a transverse member 76 having two forwardly extended arms 78 at its ends in which shafts on the ends of rolls 74 are journaled. A pair of arms 80 extend from the ends of transverse member 76 toward the opposite end of the rear section of the camera housing and include forwardly extended arms 82 on which a pair of levers 84 are pivotally mounted at their ends. Roll 72 is mounted for rotation on the opposite ends of levers 84 and is biased toward roll 74 by a pair of torsion springs 85 each engaged at one end in one of arms 80 and engaged at its opposite end in a portion of one of levers 84.

A drive motor and transmission, to be described more fully hereafter, are provided for rotating either or both rolls 72 and 74 to advance a film unit between the rolls while applying compressive pressure to the film unit. Means are provided in the rear housing section for feeding the leading edge (i.e., edge of container 48) of the forwardmost film unit, following the exposure thereof, through slot 58 into the bite of rolls 72 and 74 so that the latter may engage, advance, and process a film unit. These last-mentioned feeding means are illustrated as comprising a pair of friction rolls 86 each mounted on one end of a lever 88 in position to engage the forwardmost film unit through openings 64 in forward wall 52 of a film pack container 50. Levers 88 are pivotally mounted intermediate their ends on frame 75 and are biased by torsion springs 90 so as to urge friction rolls 86 rearwardly into engagement with a film unit. Rolls 86 are designed to be rotated in engagement with the foremost film unit to advance it into the bits of rolls 72 and 74 and for this purpose, are driven from rolls 72 by an endless flexible drive coupling such as an O-ring 92. Rolls 86 are rotated during the rotation of rolls 72 and 74 and provision is made for disengaging rolls 86 from the film unit as soon as the leading edge portion of the film unit becomes engaged between rolls 72 and 74 and thereby prevent the movement of the next succeeding film unit into the bite of the pressure rolls during processing of the preceding film unit. These last-mentioned means include a pair of levers 94 each pivotally mounted intermediate its ends with one end engaged with a shaft on the end of roll 72 and the other end engaged with the end of lever 88 opposite roll 86 for pivoting lever 88 in a clockwise direction to disengage roll 86 from the forwardmost film unit as roll 72 is displaced forwardly relative to roll 74 and frame 75 as a film unit enters the bite of rolls 72 and 74. The pivotal mounting shown multiplies the motion of rolls 86 to provide for a relatively large displacement of rolls 86 in response to a relatively small displacement of roll 72.

Rolls 72 and 74 are preferably driven by an electrically operated motor housed within one of the sections of the camera housing, coupled with roller 74 through a suitable transmission which will be described more fully hereafter, and powered by a battery (not shown) also housed within one of the sections of the camera housing, for example, mounted on door 34 so as to be located between the door and the end of film pack 40. The circuit for controlling the operation of the motor is illustrated in FIG. 6 as including the motor 96, a battery 98, and first and second switches 100 and 102 connected in parallel with one another and in series with the motor and battery. First switch 100 is manually actuated to energize motor 96 which drives rollers 72 and 74 and friction rolls 86. Switch 100 is preferably of the type which closes only momentarily, preferably for a time sufficient to feed the leading end of a film unit into the bite of rolls 72 and 74 which, in turn, advance the film unit beyond the friction rolls into the engagement with the operating lever 104 of a second switch 102 thereby closing the second switch which keeps motor 96 energized as long as a film unit is engaged with the operating lever to insure operation of the motor and advancement of a film unit completely between rolls 72 and 74. After the trailing edge of the film unit has been advanced completely between the pressure rolls past the operating lever 104 of switch 102, the latter will open disconnecting the motor from battery 98 and terminating the processing cycle. Switch 100 may be incorporated in the shutter mechanism of the camera and coupled with a manually operable shutter actuating element such as a shutter release 162 so as to initiate a processing cycle immediately following exposure of a film unit; and is preferably of a conventional type which remains closed for a predetermined period and then opens itself, with the duration of the closure period being selected to insure engagement between the film unit and operating lever 104 of switch 102. It is anticipated that the processing cycle for each film unit may require on the order of ⅓ of a second thus making the operation camera semi-automatic and enabling the operator to make exposures and process the exposed film units at the relatively rapid rate of three per second and because the friction feed rolls 86 are displaced from engagement with a film unit during movement of a film unit between the processing rolls it is impossible to advance in process two film units at a time.

Third housing section 16 is generally parallelepiped shaped and is pivotable with respect to the first housing section about the axis of processing roll 74. The third housing section includes an outer wall 106 which, in the operative position of the camera housing, functions as the forward wall of the camera; and an outer wall 108 which in the folded position of the camera constitutes an end wall of the camera and in the operative position of the camera housing, functions as one of the upper walls of the camera housing. The third housing section also includes side walls 109 engaged between side walls 30 and 32 of the rear housing section. A conventional photographic objective lens 110 is mounted within third housing section 16.

Third housing section 16 incorporates a shutter mechanism (not shown) which may include a photocell 160 and a button 162 for releasing the shutter to make an exposure and closing switch 100 to initiate a processing cycle. Drive motor 96 for processing rolls 72 and 74 is also incorporated in the third housing section and is coupled with processing roll 74 via a speed-reducing transmission including gears 164, 166, 168, 170, and 172. The drive motor is preferably of a low torque, very high speed type requiring the reduction gears to provide the torque at rolls 72 and 74 necessary to advance each film unit between the rolls at the proper speed.

Second housing section 14 comprises an outer wall 112 pivotally connected at one end via hinge 20 to rear housing section 12, and dependent side walls 114 engaged between side walls 30 and 32 of the rear housing section. A substantially planar and preferably front surface, mirror 116 is mounted on the inside of wall 112 for reflecting light from lens 110 toward a film unit positioned for exposure in the rear housing section.

The camera includes a conventional view finder, generally designated 117, mounted within the second housing section adjacent one side of mirror 116 and including entrance and exit apertures provided with mirrors 118 at opposite ends of the second housing section.

Fourth housing section 18 comprises an outer roll 120 pivotally connected at one side to outer wall 112 of second housing section 14 at hinge 24 and along its opposite side to wall 108 of third housing section 16 at hinge 26, and dependent side walls 122 engaged between side walls 114 of the second housing section and outside of the ends of third housing section 16. Wall 120 includes an opening 124 for receiving the forward end of the view finder 117 when the camera housing is folded, in which position wall 120 appears as an extension of wall 112 of the second housing section.

The fourth housing section functions essentially as a connection between the second and third housing sections and as one side of a chamber providing a light path between lens 110 and a film unit positioned for exposure. The two remaining sides of this chamber in addition to those provided by the housing sections are each formed by fan-like bellows 126 of the types shown and described, for example, in the copending U.S. patent application of Irving Erlichman, Ser. No. 655,859, filed on an even date herewith. Each of these bellows comprises a plurality of interlocking blades 128 all pivoted about a single axis and covered at their ends and along the sides of the two outermost blades by side walls 30, 109, 114, and 122. Blades 128 have generally U-shaped cross-sections, are adapted to telescope into one another and are more fully described in the aforementioned Erlichman application.

The camera also includes means, also described in greater detail in the Erlichman application, for retaining the camera housing in an operative or erect position and in the form shown, these means include a rigid link 129 pivoted at one end on second housing section 14 engaged for pivoting and sliding movement at its other end on first housing section 12. A detent (not shown) coupled with a manually operable button is provided on the first housing section for engaging the end of link 129 to retain the latter against movement and thereby secure the housing sections in the erect position shown in FIG. 2.

The third housing section provides the forward wall of the camera (i.e., the wall facing the subject) when the latter is in an operative condition, and for preventing light from being admitted into the camera housing in the region of processing rolls 72 and 74. Film units, as they are processed, are advanced directly from the camera into the light and accordingly, outer wall 106 of the third housing section is formed with an opening 130 for passing the film units. A pair of flexible convergent lips 132 are mounted on the inside of wall 106 between the latter and the processing rolls to provide a lighttight passage through which successive film units may be advanced from the camera and prevents the emission of light into the camera. Lips 132 may also function to grip and hold the trailing end of each film unit and prevent it from falling until the operator can grasp the film unit.

A baffle 134 is pivotally mounted within and on rear housing section 12 and is pivotally biased in a clockwise direction against a stop into the operative position shown in FIG. 3 in which the baffle prevents exposure of the photosensitive element by off-axis light transmitted by the lens.

It will be appreciated from the foregoing that the camera of the invention incorporates a single power source for feeding a succession of film units from a film pack and processing the film units and that these operations, together with exposure, are accomplished dependably and essentially automatically within a minimum of simple structure and controls which also enable the exposure and processing of a number of film units in relatively rapid sequence. Compactness, simplicity, and low cost are achieved by employing a single motor to operate both the film feed and processing mechanisms and by rotating the processing and feed rolls continuously and simultaneously throughout the feed and processing cycle for each film unit; while dependability is assured and the available power is conserved by employing each film unit itself to disenable the film feed roll as soon as it has performed its function.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:
1. Photographic apparatus for processing a succession of film units arranged in stacked relation in a container comprising, in combination:
 a pair of processing rollers;
 first mounting means mounting said processing rollers for rotation in juxtaposition with one of said rollers being movable toward and away from the other of said rollers;
 first resilient means for biasing said one roller toward said other roller;
 a feed roller;
 second mounting means supporting said feed roller in engagement with a film unit contained in a container;

second resilient means coupled with said second mounting means for urging said feed roller into engagement with said film unit;

said second mounting means being coupled with said one roller for displacing said feed roller against the bias of said second resilient means away from said film unit in response to displacement of said one roller apart from said other roller by a film unit being moved between said processing rollers; and drive means for simultaneously rotating said feed roller to feed a film unit from a container into the bite of said processing rollers and rotating at least one of said processing rollers to advance a film unit therebetween.

2. Photographic processing apparatus as defined in claim 1 wherein said drive means include an electric motor coupled to said feed roller and at least one of said processing rollers, first control means for energizing said motor at least long enough to feed a film unit from a container into the bite of said processing rollers and second control means for maintaining said motor in an energized condition as long as a film unit is engaged between said processing rollers.

3. Photographic processing apparatus as defined in claim 2 wherein said second control means include switch means electrically connected between said motor and a source of electric current, said switch means including an operating member for closing said switch means in response to engagement by a film unit, located adjacent said processing rollers in the path of movement of said film unit between said processing rollers.

4. Photographic processing apparatus as defined in claim 3 wherein said operating element of said switch means is located to the side of said processing rollers opposite said feed roller and said first control means are adapted to maintain said motor in an energized condition long enough to advance a film unit between said processing rollers into engagement with said operating element of said switch means.

5. Photographic processing apparatus as defined in claim 4 wherein said first control means comprise second switch means connected in parallel relation with said first switch means between said motor and said source of electric current.

6. Photograhic processing apparatus as defined in claim 2 including lens and shutter means for exposing a film unit within said film pack container and manually operable means for actuating said shutter to make an exposure, the last-mentioned means being coupled with said first control means for energizing said motor to process a film unit immediately following exposure thereof.

7. Photographic apparatus for holding a container of stacked film units with one of said film units in position for exposure and processing said one film unit subsequent to exposure, said apparatus comprising, in combination:

a pair of juxtaposed processing rollers for engaging and moving said film units through said apparatus during processing thereof;

film feeding means for engaging one of said film units within said container and moving said one film unit from said container into the bite of said processing rollers;

drive means for simultaneously rotating said processing rollers to move a film unit engaged therebetween and driving said film feeding means to feed a film unit into the bite of said processing rollers; and disenabling means for sensing the presence of a film unit engaged between said processing rollers coupled with said film feeding means for disenabling said film feeding means to move another of said film units toward the bite of said processing rollers.

8. Photographic apparatus as defined in claim 7 wherein said disenabling means include means for preventing said film feeding means from engaging a film unit within said container when a film unit is engaged between said processing rollers.

References Cited

UNITED STATES PATENTS

| | | | |
|---|---|---|---|
| 2,477,324 | 7/1949 | Wolff | 95—13 |
| 3,350,990 | 11/1967 | Finelli et al. | 95—13 |

NORTON ANSHER, *Primary Examiner.*

RICHARD L. MOSES, *Assistant Examiner.*